(12) United States Patent
Boland (10) Patent No.: US 10,086,799 B2
(45) Date of Patent: Oct. 2, 2018

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 673 days.

(21) Appl. No.: 13/806,517

(22) PCT Filed: Jun. 23, 2010

(86) PCT No.: PCT/EP2010/058908
§ 371 (c)(1),
(2), (4) Date: Mar. 13, 2013

(87) PCT Pub. No.: WO2011/160689
PCT Pub. Date: Dec. 29, 2011

(65) Prior Publication Data
US 2013/0174369 A1 Jul. 11, 2013

(51) Int. Cl.
*B60S 1/40* (2006.01)
*B60S 1/38* (2006.01)

(52) U.S. Cl.
CPC .............. *B60S 1/40* (2013.01); *B60S 1/386* (2013.01); *B60S 1/3856* (2013.01); *B60S 1/3808* (2013.01); *B60S 1/3858* (2013.01); *B60S 1/3877* (2013.01); *B60S 2001/4054* (2013.01)

(58) Field of Classification Search
CPC ...... B60S 1/386; B60S 1/3856; B60S 1/3877; B60S 1/3851; B60S 1/3858; B60S 1/3849; B60S 1/3808; B60S 2001/3812
USPC .................. 15/250.32, 250.361, 250.43, 15/250.44–250.48, 250.201
See application file for complete search history.

(56) References Cited

U.S. PATENT DOCUMENTS

2005/0120503 A1* 6/2005 Park ................. B60S 1/3459
15/250.34
2006/0265830 A1* 11/2006 Walworth et al. ......... 15/236.02
2007/0113366 A1 5/2007 Walworth et al.
(Continued)

FOREIGN PATENT DOCUMENTS

DE 102008041358 A1 2/2010
EP 2113432 A1 11/2009
(Continued)

OTHER PUBLICATIONS

FR2854852 (machine translation), 2004.*

*Primary Examiner* — Andrew A Horton
(74) *Attorney, Agent, or Firm* — Robert L. Stearns; Dickinson Wright, PLLC (57) ABSTRACT

A windscreen wiper device of the flat blade type, comprising a longitudinal strip, as well as an elongated wiper blade of a flexible material, which can be placed in abutment with a windscreen to be wiped, which wiper blade is of the flat blade type and includes at least one groove, in which groove the longitudinal strip is disposed, wherein the windscreen wiper device further comprises a connecting device for detachably connecting the wiper blade to an oscillating arm the connecting device having a substantially U-shaped cross-section, wherein legs of the U-shaped cross-section are connected to the flexible material on opposite sides thereof, wherein the legs are provided with two pairs of opposite protrusions, and wherein the protrusions for exerting a transverse force on the flexible material, thereby locally squeezing the flexible material onto the longitudinal strip.

16 Claims, 5 Drawing Sheets

(56) References Cited

U.S. PATENT DOCUMENTS

| | | | |
|---|---|---|---|
| 2007/0214593 A1* | 9/2007 | Boland | B60S 1/3848 15/250.23 |
| 2009/0056049 A1 | 3/2009 | Jarasson et al. | |
| 2009/0307862 A1 | 12/2009 | Boland | |
| 2010/0024149 A1* | 2/2010 | Erdal | B60S 1/3868 15/250.32 |

FOREIGN PATENT DOCUMENTS

| | | | |
|---|---|---|---|
| FR | 2854852 A1 * | 11/2004 | B60S 1/40 |
| FR | 2854852 A1 | 11/2004 | |

* cited by examiner

WINDSCREEN WIPER DEVICE

BACKGROUND OF THE INVENTION

1. Technical Field

The present invention relates to a windscreen wiper device, particularly for automobiles, comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of the carrier element is disposed, wherein the windscreen wiper device comprises a mounting head for transferring a reciprocal movement to an oscillating arm, wherein the windscreen wiper device further comprises a connecting device for detachably connecting the wiper blade to the oscillating arm near one end thereof around a pivot axis.

The invention also refers to a wiper blade to be used in such a windscreen wiper device.

2. Related Art

Such a windscreen wiper device and such a wiper blade are generally known. This prior art wiper blade is designed as a so-called "flat blade" or "yokeless blade", wherein no use is made of several yokes pivotally connected to each other, but wherein the wiper blade is biassed by the carrier element, as a result of which it exhibits a specific curvature. In practice the wiper blade often comprises a spoiler at a side thereof facing away from the windscreen to be wiped. The spoiler is also called an "air deflector".

The object of the invention is to provide an improved windscreen wiper device.

In order to accomplish that objective, a windscreen wiper device of the type referred to in the introduction is characterized according to the invention in that the connecting device has a substantially U-shaped cross-section, wherein legs of the U-shaped cross-section are connected to the flexible material of the wiper blade on opposite sides thereof, wherein the legs are provided with two pairs of opposite protrusions near the outer ends of the connecting device, and wherein the protrusions extend laterally inwardly for exerting only a transverse force on the flexible material of the wiper blade, thereby locally squeezing the flexible material onto the longitudinal strip, in order to block any lateral movement of the longitudinal strip at the location of the interconnection of the connecting device and the wiper blade. In use, during each oscillatory movement of the oscillatory arm, the wiper blade at the location outside the connection device would normally suffer from the so-called "fishtailing phenomenon", wherein the wiper blade on opposite sides of the connecting device vibrates in an uncontrollable manner parallel to a windscreen to be wiped. Obviously, this "fishtailing phenomenon" results in deteriorated wiping properties, with all negative consequences involved, particularly at high speeds. According to the invention the protrusions extend laterally inwardly only from a vertical part of each leg of the U-shaped cross-section for exerting only a transverse force on the flexible material of the wiper blade, thereby allowing the longitudinal strip to exhibit a curvature at the location of the interconnection of the connecting device and the wiper blade. Experimental results have shown that the "fishtailing phenomenon" is avoided at least to a large extend, so that the wiping properties are improved. Preferably, the ratio (L'/L) between the width L' of the flexible material at the location of the protrusions and the width L of the flexible material at a location outside the protrusions (but inside the connecting device) varies between 30% and 1%. Preferably, the protrusions have a round cross-section.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade. Further, the present invention is not restricted to automobiles, but also refers to other fast vehicles, such as trains and the like.

In a preferred embodiment of a windscreen wiper device in accordance with the invention the legs of the U-shaped cross-section are movable from an open position, wherein the wiper blade including the longitudinal strip can be placed inside the connecting device at the location of their interconnection, to a closed position, and wherein the legs are clamped around the flexible material of the wiper blade. With the use of a special tool, the legs are particularly pushed against a spring force (as a result of the elasticity of the material from which the connecting device is made) from the closed position into the open position, wherein the legs are allowed to automatically spring back from the open position into the closed position.

In another preferred embodiment of a windscreen wiper device according to the invention in the closed position the wiper blade and the longitudinal strip are mutually fixated by the legs at the location of the interconnection of the connecting device and the wiper blade, wherein in the closed position the wiper blade is allowed to move in longitudinal direction relative to the longitudinal strip outside the location of the interconnection of the connecting device and the wiper blade. In other words, the wiper blade and the longitudinal strip are not allowed to mutually move under the connecting device, but in all other areas along the wiper blade a slight movement thereof is made possible in order to allow the wiper blade to follow any curvature of the windscreen to be wiped. In the closed position the legs are particularly slightly deforming (the rubber of) the wiper blade at the location of the interconnection of the connecting device and the wiper blade.

In another preferred embodiment of a windscreen wiper device in accordance with the invention the connecting device is detachably connected to oscillating arm with the interposition of a joint part, wherein the joint part is detachably connected to the connecting device by engaging protrusions of the connecting device, at the location of the pivot axis, in recesses provided in the joint part. This is preferably realized through a snapping or clipping operation.

In another preferred embodiment of a windscreen wiper device according to the invention the joint part has an at least substantially U-shaped cross-section at the location of its connection to the connecting device, wherein the joint part is provided with the recesses provided coaxially with the pivot axis. In particular, the protrusions extend outwards on either side of the connecting device and are preferably cylindrical in shape. In the alternative, the protrusions are spherical or frusto-conical in shape. the protrusions that function as bearing surfaces are thus paced far apart, so that forces exerted thereon will be relatively low. In yet another preferred variant the joint part is provided with co-axial through holes in legs of the U-shaped cross-section thereof, wherein a pivot pin is inserted in the through holes. Accordingly, the wiper blade may then be connected to the oscillating arm on the basis of a so-called "sidelock system". The oscillating arm is provided with a joint pin or a pivot pin to be inserted in the co-axial through holes. The pivot pin protrudes in a direction towards the wiper blade and has a pivot axis extending in a direction of the oscillating movement of the oscillating arm.

In another preferred embodiment of a windscreen wiper device in accordance with the invention the joint part comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

A windscreen wiper device according to the invention comprises a mounting head fixed for rotation to a shaft, wherein the shaft is rotatable alternately in a clockwise and in a counter-clockwise sense carrying the mounting head into rotation. The oscillating arm is connected to the mounting head fixed for rotation to the shaft driven by a small motor.

In use, the shaft rotates alternately in a clockwise and in a counter-clockwise sense carrying the mounting head into rotation also, which in turn draws the oscillating arm into rotation and by means of the connecting device moves the wiper blade. Further, a windscreen wiper device in accordance with the invention comprises a connecting piece positioned on both ends of the wiper blade and connected to an end of the longitudinal strip.

The present invention also relates to a wiper blade manufactured as a single (separate) constructional element of a flexible material, which can be placed in abutment with a windscreen to be wiped, which wiper blade is of the flat blade type and includes at least one groove in which groove a longitudinal strip is disposed, the wiper blade comprising a connecting device detachably connected thereto, characterized by the connecting device having a substantially U-shaped cross-section, wherein legs of the U-shaped cross-section are connected to the flexible material of the wiper blade on opposite sides thereof, wherein the legs are provided with two pairs of opposite protrusions near the outer ends of the connecting device, and wherein the protrusions extend laterally inwardly for exerting only a transverse force on the flexible material of the wiper blade, thereby locally squeezing the flexible material onto the longitudinal strip, in order to block any lateral movement of the longitudinal strip at the location of the interconnection of the connecting device and the wiper blade.

It is noted that the connecting device is not necessarily made in one piece, but it can also be composed of an assembly of parts.

THE DRAWINGS

The invention will now be explained more in detail with reference to figures illustrated in a drawing, wherein FIGS. 1A and 1B are a perspective, schematic view of a preferred embodiment of a windscreen wiper device according to the invention, with and without (a part of) an oscillating arm, respectively, whereas

DETAILED DESCRIPTION

Figure 1A:
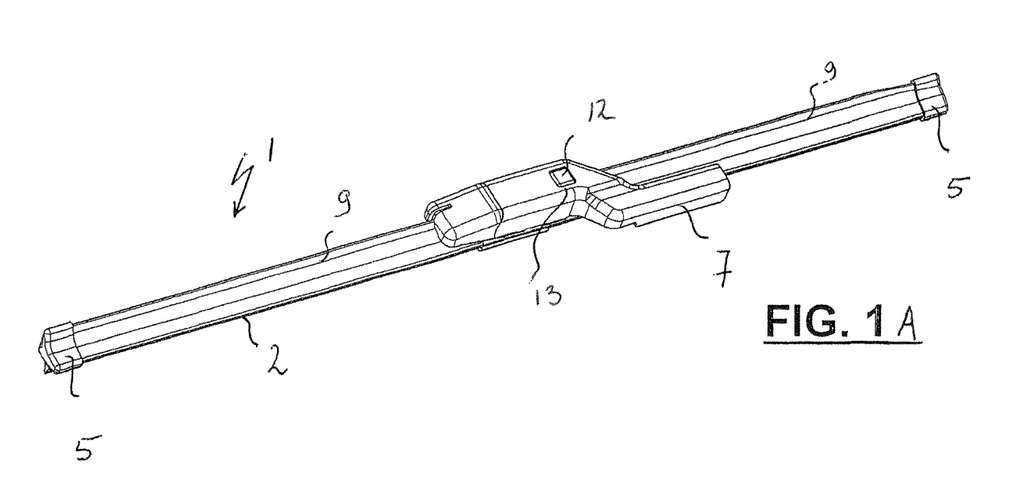
Figure 1B:
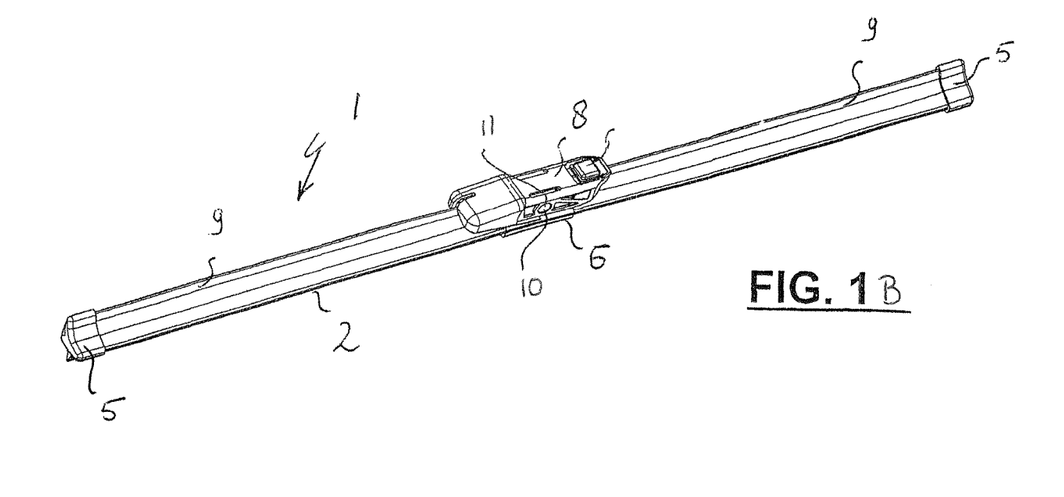
Figure 1C:
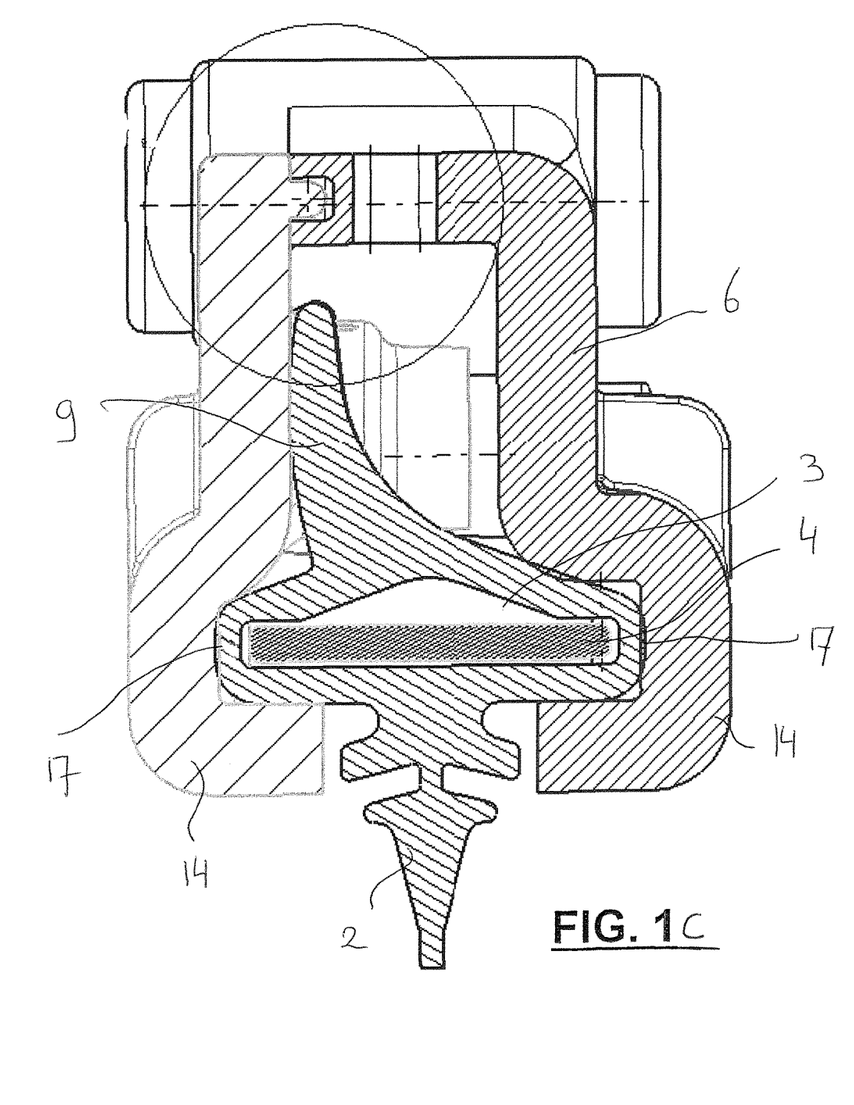
FIG. 1C is a cross-sectional view of FIG. 1A at the location of a connecting device.

FIG. 1 shows a preferred variant of a windscreen wiper device 1 according to the invention. The windscreen wiper device is built up of an elastomeric (rubber) wiper blade 2 comprising a central longitudinal groove 3, wherein a longitudinal strip 4 made of spring band steel is fitted in the longitudinal groove 3 (see FIGS. 5, 6 and 7). The strip 4 forms a flexible carrier element for the rubber wiper blade 2, as it were, which is thus biassed in a curved position (the curvature in operative position being that of a windscreen to be wiped). An end of the strip 4 and/or an end of the wiper blade 2 is connected on either side of the windscreen wiper device 1 to respective connecting pieces or "end caps" 5. In this embodiment, the connecting pieces 5 are separate constructional elements, which may be form-locked as well as force-locked to both ends of the strip 4 and/or ends of the wiper blade 2. In another preferred variant, the connecting pieces 5 are in one piece with the strip 4 made of spring band steel. The windscreen wiper device 1 is furthermore built up of a connecting device 6 of metal for connecting an oscillating wiper arm 7 thereto, with the interposition of a joint part 8. The oscillating wiper arm 7 is pivotally connected to the connecting device 6 about a pivot axis near one end. The preferred embodiment of FIG. 1 according to the invention comprises a spoiler or "air deflector" 9 which is made in one piece with the rubber wiper blade 2 and which extends along the entire length thereof.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

As shown in FIG. 1, the connecting device 6 comprises two cylindrical protrusions 10 extending outwards on either side of the connecting device 6. These protrusions 10 pivotally engage in identically shaped cylindrical recesses 11 of the plastic joint part 8. The protrusions 10 act as bearing surfaces at the location of the pivot axis in order to pivot the joint part 8 (and the oscillating arm 7 attached thereto) about the pivot axis near one end of the oscillating arm 7. The protrusions 10 are preferably in one piece with the connecting device 6. In the alternative, the protrusions 10 are part of a single pivot pin perpendicular to the connecting device 6. As can be seen in FIG. 1, the joint part 8 comprises a resilient tongue 12 extending outwardly, while the oscillating arm 7 has an U-shaped cross-section at the location of its connection to the joint part 8, so that the tongue 12 engages in an identically shaped hole 13 provided in a base of the U-shaped cross-section. The connecting device 6 with the wiper blade 2 is mounted onto the oscillating arm 7 as follows. The joint part 8 being already clipped onto the connecting device 6 is pivoted relative to the connecting device 6, so that the joint part 8 can be easily slided on a free end of the oscillating arm 7. During this sliding movement the resilient tongue 12 is initially pushed in against a spring force and then allowed to spring back into the hole 13, thus snapping, that is clipping the resilient tongue 12 into the hole 13. This is a so-called bayonet-connection. The oscillating arm 7 together with the joint part 8 may then be pivoted back in a position parallel to the wiper blade 2 in order to be ready for use. By subsequently pushing in again the resilient tongue 12 against the spring force (as if it were a push button), the connecting device 6 and the joint part 8 together with the wiper blade 2 may be released from the oscillating arm 7. Dismounting the connecting device 6 with the wiper blade 2 from the oscillating arm 7 is thus realized by sliding the connecting device 6 and the joint part 8 together with the wiper blade 2 in a direction away from the oscillating arm 7.

Figure 2:
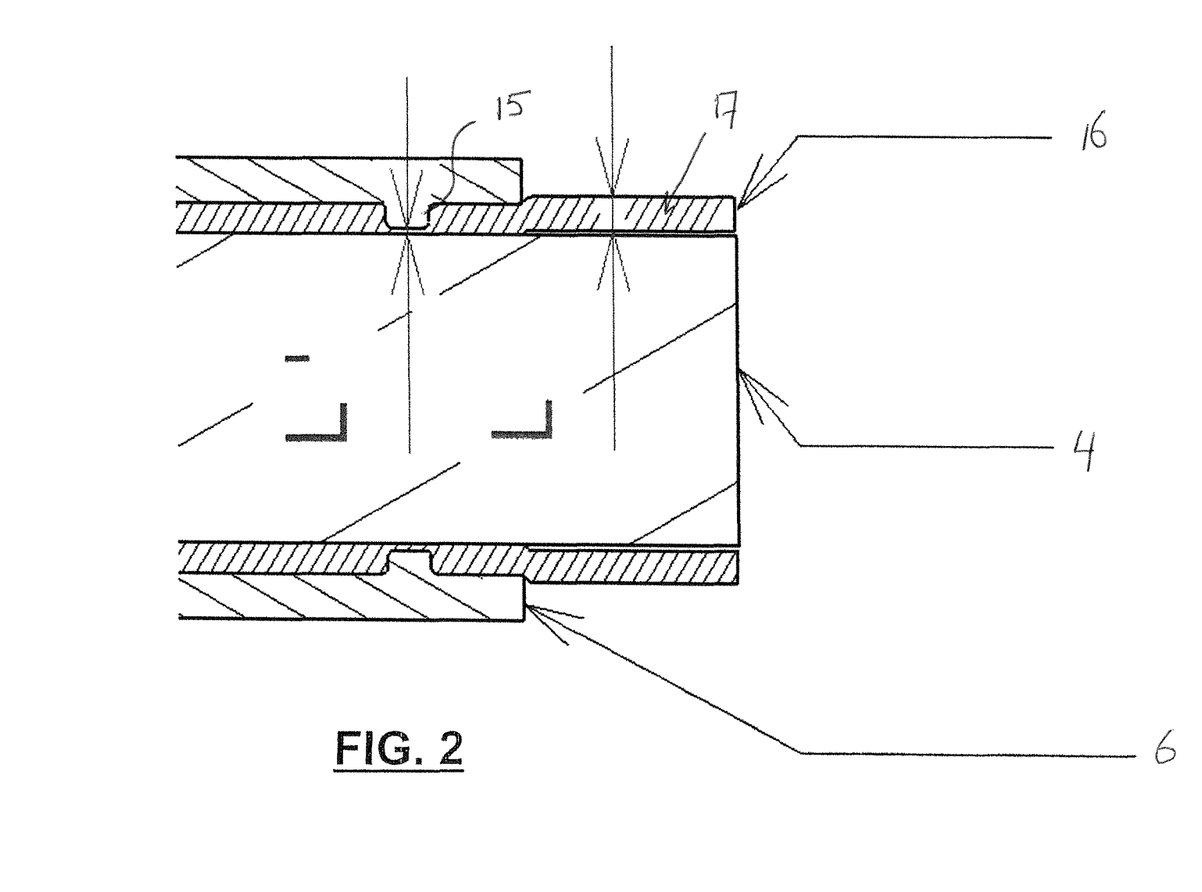
FIG. 2 is a top view of a longitudinal section of a wiper blade used in the windscreen wiper device of FIG. 1, at the location of the interconnection between the wiper blade and a connecting device for the oscillating arm.
Figure 3:
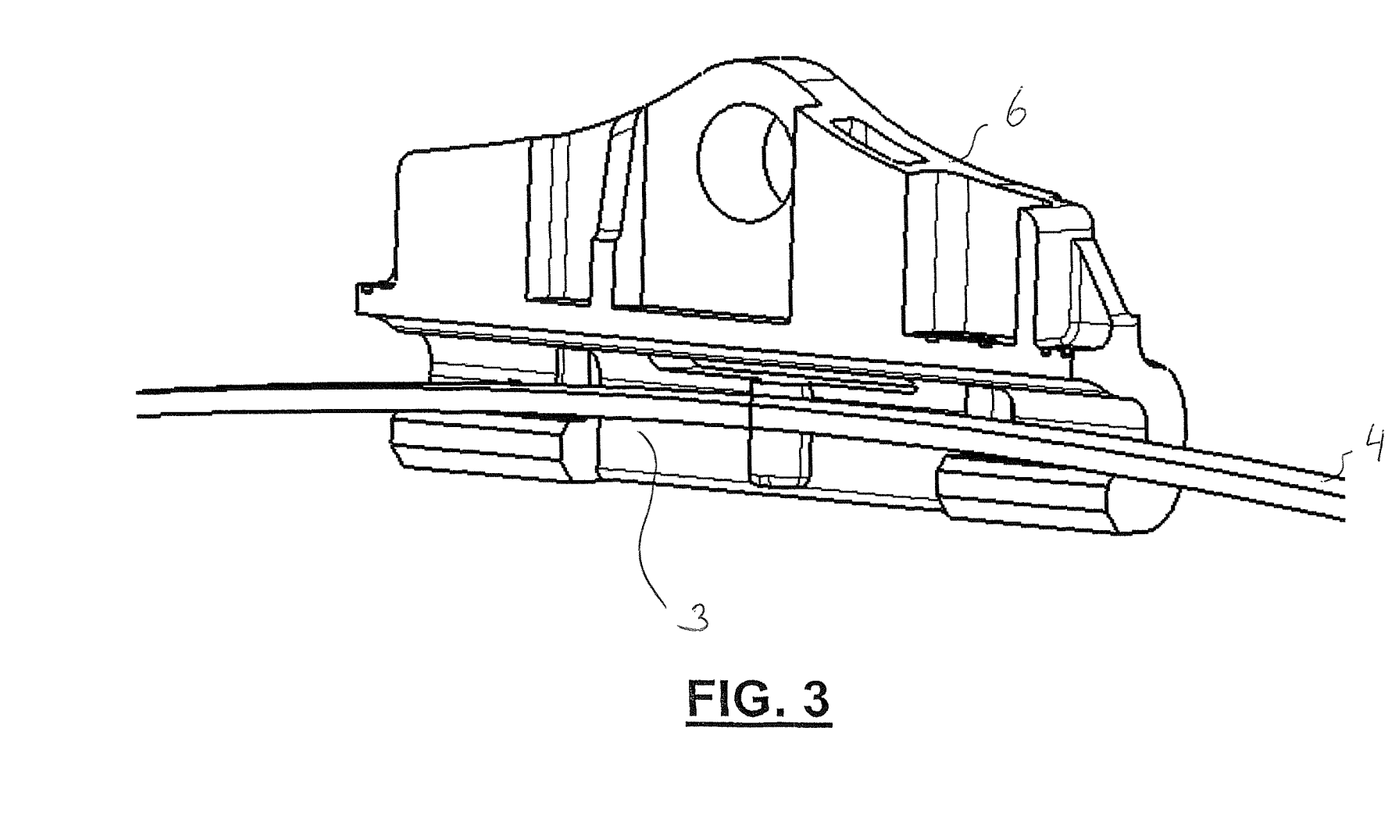
FIG. 3 is perspective view of a cross-section of the connecting device of FIG. 2.

FIGS. 2 and 3 show a top view of a longitudinal section and a perspective view of a cross-section of the connecting device 6, showing the working principle of the connecting device 6 according to the invention As mentioned earlier and with reference to FIG. 3, this connecting device 6 has a U-shaped cross-section with legs 14 having a C-shaped cross-section. With the help of a special tool (not shown) the legs 14 are moved from a non-operative position into an operative position. In fact, the tool pushes the legs 14 outwardly against a spring force of the metal from which the connecting device 6 is manufactured. This is possible as a result of the elastical properties of the metal. In the open position the wiper blade 2 is mounted inside the connecting device 6 at the location of their interconnection, to an intermediate position. In the latter position the longitudinal strip 4 of the carrier element is slided into the central longitudinal groove 3 of the wiper blade 2. If considered expedient, a lubricant is used to facilitate insertion of the longitudinal strip 4 inside the longitudinal groove 3. Finally, when the wiper blade 2 and the longitudinal strip 4 are in the right position, the special tool is removed. Consequently, the legs 14 of the connecting device 6 are allowed to spring back into a closed position, wherein the legs 14 are clamped around the wiper blade 2, while slightly deforming the rubber of the wiper blade 2 at the location where the legs 14 engage the rubber. In the closed position the wiper blade 2 and the longitudinal strip 4 are mutually fixated by the legs 14 at the location of the interconnection of the connecting device 6 and the wiper blade 2, whereas in the closed position the wiper blade 2 is allowed to move in longitudinal direction relative to the longitudinal strip 4 outside the location of the interconnection of the connecting device 6 and the wiper blade 2.

Now referring to FIG. 2 the legs 14 are provided with two pairs of opposite protrusions 15 near the outer ends 16 of the connecting device 6, wherein the protrusions 15 extend laterally inwardly for exerting only a transverse force on the rubber 17 of the wiper blade 2, thereby locally squeezing the rubber 17 onto the longitudinal strip 4. Accordingly, any lateral movement of the longitudinal strip 4 at the location of the interconnection of the connecting device 6 and the wiper blade 2 is blocked. The protrusions 15 have the following additional function. In use, during each oscillatory movement of the oscillatory arm 7, the wiper blade 2 at the location outside the connection device 6 would normally suffer from the so-called "fishtailing phenomenon", wherein the wiper blade 2 on opposite sides of the connecting device 6 vibrates in an uncontrollable manner parallel to a windscreen to be wiped. Obviously, this "fishtailing phenomenon" results in deteriorated wiping properties, with all negative consequences involved, particularly at high speeds. According to the invention the protrusions 15 extend laterally inwardly only from a vertical part 18 of each leg 14 of the U-shaped cross-section for exerting only a transverse force on the rubber 17 of the wiper blade 2. Hence, the longitudinal strip 4 is allowed to exhibit a curvature at the location of the interconnection of the connecting device 6 and the wiper blade 2 (see FIG. 3). Experimental results have shown that the "fishtailing phenomenon" is avoided at least to a large extend, so that the wiping properties are improved.

Preferably, the ratio (L'/L) between the width L' of the rubber 17 at the location of the protrusions 15 and the width L of the rubber 17 at the location outside the protrusions 15 varies between 30% and 1% (see FIG. 2). As shown, the protrusions 15 have a round cross-section.

Figure 4:
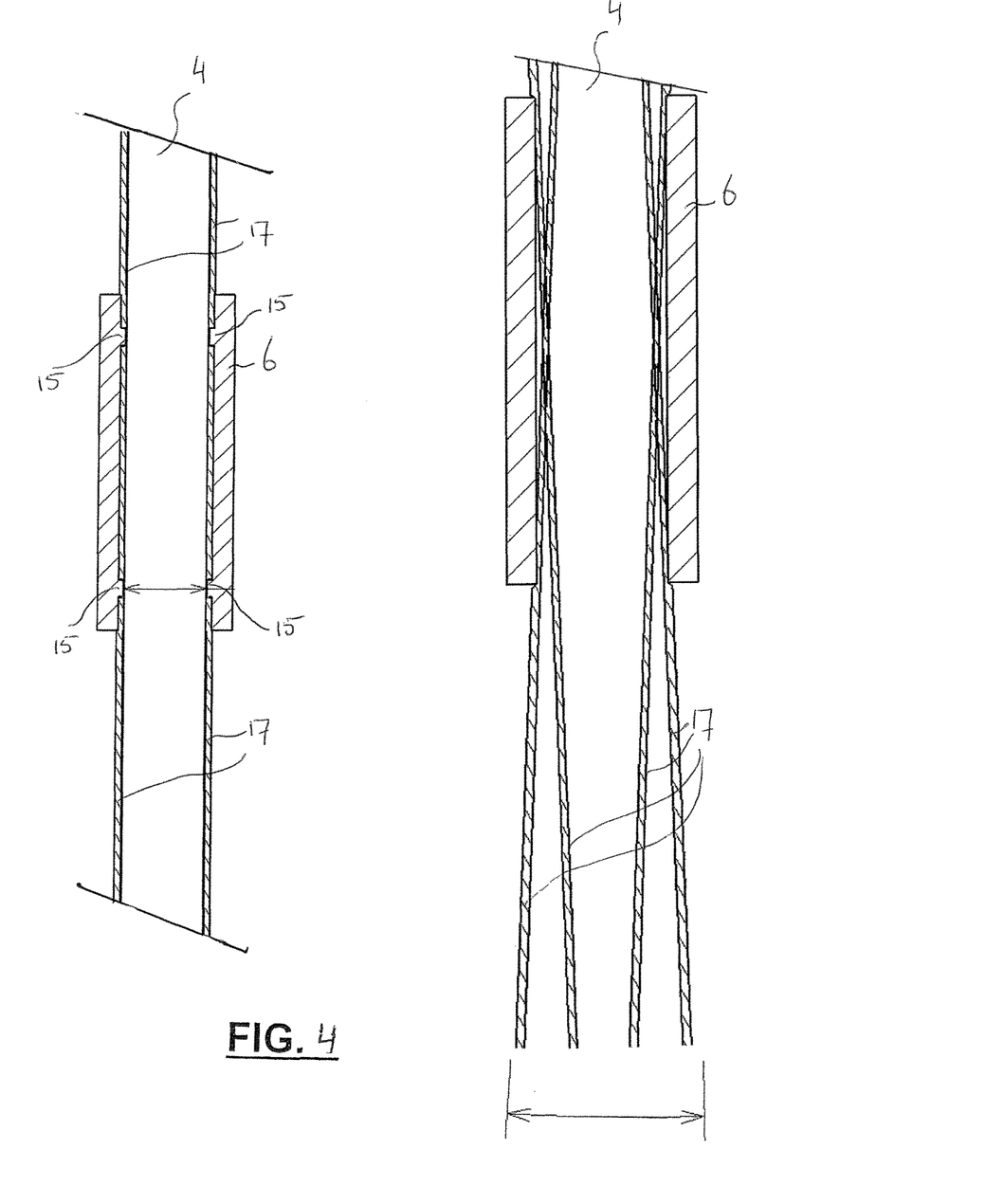
FIG. 4 schematically shows the so-called "fishtailing phenomenon".

In FIG. 4 are shown longitudinal sections of a wiper blade 2 at the location of the connecting device 6 according to the invention (left) and according to the prior art. As can be seen, the protrusions 15 exert only a transverse force onto the rubber 17, thereby avoiding the so-called "fishtailing phenomenon". According to the prior art the wiper blade 2 on opposite sides of the connecting device 6 vibrates in an uncontrollable manner parallel to a windscreen to be wiped.

The invention is not restricted to the variants shown in the drawing, but it also extends to other preferred embodiments that fall within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of said carrier element is disposed, wherein said windscreen wiper device further comprises a mounting head for transferring a reciprocal movement to an oscillating arm, and a connecting device for detachably connecting said wiper blade to the oscillating arm near one end thereof around a pivot axis, wherein said connecting device has a substantially U-shaped cross-section, wherein legs of said U-shaped cross-section are connected to the flexible material of said wiper blade on opposite sides thereof, wherein said legs are provided with two pairs of opposite protrusions near the outer ends of said connecting device, and wherein said protrusions extend laterally inwardly and exert only a transverse force on the flexible material of said wiper blade in order to allow said longitudinal strip to exhibit a curvature at the location of the interconnection of said connecting device and said wiper blade, thereby locally squeezing said flexible material onto said longitudinal strip, in order to block any lateral movement of said longitudinal strip at the location of the interconnection of said connecting device and said wiper blade, and wherein a ratio (L'/L) between the width L' of said flexible material at the location of said protrusions and the width L of said flexible material at a location outside said protrusions varies between 30% and 1% said connecting device extending a predetermined length between opposite longitudinal ends thereof, and said longitudinal strip having a constant width along said length of said connecting device.

2. The windscreen wiper device according to claim 1, wherein said legs of said U-shaped cross-section are movable from an open position, wherein said wiper blade including said longitudinal strip can be placed inside said connecting device at the location of their interconnection, to a closed position, and wherein said legs are clamped around the flexible material of said wiper blade.

3. The windscreen wiper device according to claim 2, wherein said legs of said U-shaped cross-section can be pushed against a spring force from the closed position into the open position, and wherein said legs can be allowed to spring back from said open position into said closed position.

4. The windscreen wiper device according to claim 2, wherein in said closed position said wiper blade and said longitudinal strip are mutually fixated by said legs at the location of the interconnection of said connecting device and said wiper blade, and wherein in said closed position said wiper blade is allowed to move in longitudinal direction relative to said longitudinal strip outside the location of the interconnection of said connecting device and said wiper blade.

5. The windscreen wiper device according to claim 1, wherein said connecting device is detachably connectable to the oscillating arm with the interposition of a joint part, and wherein said joint part is detachably connected to said connecting device by engaging protrusions of said connecting device, at the location of said pivot axis, in recesses provided in said joint part.

6. The windscreen wiper device according to claim 5, wherein said joint part has an at least substantially U-shaped cross-section at the location of its connection to said connecting device, and wherein said joint part is provided with said recesses provided coaxially with said pivot axis.

7. The windscreen wiper device according to claim 5, wherein the protrusions extend outwards on either side of said connecting device.

8. The windscreen wiper device according to claim 5, wherein said protrusions are provided with coaxial through holes.

9. The windscreen wiper device claim 5, wherein said joint part comprises at least one resilient tongue engageable in a correspondingly shaped hole provided in a base of the U-shaped cross-section of the oscillating arm, and wherein said resilient tongue is rotatable along a hinge axis between an outward position retaining said wiper blade onto the oscillating arm and an inward position releasing said wiper blade from the oscillating arm.

10. The windscreen wiper device according to claim 1, wherein said mounting head is fixed for rotation to a shaft, and wherein the shaft is rotatable alternately in a clockwise and in a counter-clockwise sense carrying said mounting head into rotation.

11. The windscreen wiper device according to claim 1, wherein said windscreen wiper device further comprises a connecting piece positioned on both ends of said wiper blade and connected to an end of said longitudinal strip.

12. The windscreen wiper device according to claim 1, wherein said longitudinal strip has a continuously extending constant cross-section.

13. A windscreen wiper device comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of said carrier element is disposed, wherein said windscreen wiper device further comprises a mounting head for transferring a reciprocal movement to an oscillating arm, and a connecting device for detachably connecting said wiper blade to the oscillating arm near one end thereof around a pivot axis, wherein said connecting device has a substantially U-shaped cross-section, wherein legs of said U-shaped cross-section are connected to the flexible material of said wiper blade on opposite sides thereof, wherein said legs are provided with two pairs of opposite protrusions near the outer ends of said connecting device, and wherein said protrusions extend laterally inwardly and exert only a transverse force on the flexible material of said wiper blade in order to allow said longitudinal strip to exhibit a curvature at the location of the interconnection of said connecting device and said wiper blade, thereby locally squeezing said flexible material onto said longitudinal strip, in order to block any lateral movement of said longitudinal strip at the location of the interconnection of said connecting device and said wiper blade, and wherein a ratio (L'/L) between the width L' of said flexible material at the location of said protrusions and the width L of said flexible material at a location outside said protrusions varies between 30% and 1% and wherein said protrusions have a round cross-section.

14. A windscreen wiper device including a wiper blade of a flexible material, which can be placed in abutment with a windscreen to be wiped, which wiper blade is of the flat blade type and includes at least one groove in which groove a longitudinal strip is disposed, said windscreen wiper device comprising a connecting device detachably connected to said wiper blade, wherein said connecting device has a substantially U-shaped cross-section, wherein legs of said U-shaped cross-section are connected to the flexible material of said wiper blade on opposite sides thereof, wherein said legs are provided with two pairs of opposite protrusions near the outer ends of said connecting device, and wherein said protrusions extend laterally inwardly for exerting only a transverse force on the flexible material of said wiper blade in order to allow said longitudinal strip to exhibit a curvature at the location of the interconnection of said connecting device and said wiper blade, thereby locally squeezing said flexible material onto said longitudinal strip, in order to block any lateral movement of said longitudinal strip at the location of the interconnection of said connecting device and said wiper blade, and wherein a ratio (L'/L) between the width L' of said flexible material at the location of said protrusions and the width L of said flexible material at a location outside said protrusions varies between 30% and 1% said connecting device extending a predetermined length between opposite longitudinal ends thereof, and said longitudinal strip having a constant width along said length of said connecting device.

15. The windscreen wiper device according to claim 1, wherein said longitudinal strip has a continuously extending constant cross-section.

16. The windscreen wiper device according to claim 14, wherein each of said protrusions has a round cross-section.

* * * * *

UNITED STATES PATENT AND TRADEMARK OFFICE
CERTIFICATE OF CORRECTION

PATENT NO.        : 10,086,799 B2
APPLICATION NO.   : 13/806517
DATED             : October 2, 2018
INVENTOR(S)       : Xavier Boland Page 1 of 1

It is certified that error appears in the above-identified patent and that said Letters Patent is hereby corrected as shown below:

In the Claims

Column 8, Line 55 "claim 1" should read --claim 14--

Signed and Sealed this
Thirtieth Day of July, 2019

Andrei Iancu
*Director of the United States Patent and Trademark Office*